(12) United States Patent
Chiu

(10) Patent No.: US 7,548,660 B2
(45) Date of Patent: Jun. 16, 2009

(54) SYSTEM AND METHOD OF SPATIO-TEMPORAL EDGE-PRESERVED FILTERING TECHNIQUES TO REDUCE RINGING AND MOSQUITO NOISE OF DIGITAL PICTURES

(75) Inventor: Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 685 days.

(21) Appl. No.: 11/239,965

(22) Filed: Sep. 30, 2005

(65) Prior Publication Data

US 2007/0076972 A1     Apr. 5, 2007

(51) Int. Cl.
*G06K 9/40* (2006.01)

(52) U.S. Cl. ............... 382/266; 382/260; 382/274; 382/275; 358/3.26; 358/3.27; 358/463

(58) Field of Classification Search ............. 382/260, 382/266, 269, 275; 358/3.26, 3.27, 463
See application file for complete search history.

(56) References Cited

U.S. PATENT DOCUMENTS

| | | | | |
|---|---|---|---|---|
| 5,802,218 | A * | 9/1998 | Brailean | 382/275 |
| 5,832,115 | A * | 11/1998 | Rosenberg | 382/199 |
| 6,795,588 | B1 * | 9/2004 | Nio et al. | 382/261 |
| 7,006,255 | B2 * | 2/2006 | Sun et al. | 358/3.27 |
| 7,076,113 | B2 * | 7/2006 | Le Dinh | 382/261 |
| 7,292,733 | B2 * | 11/2007 | Monobe et al. | 382/261 |
| 2003/0081854 | A1 | 5/2003 | Deshpande | |

FOREIGN PATENT DOCUMENTS

| | | |
|---|---|---|
| EP | 0 797 349 A2 | 9/1997 |
| WO | 01 24115 A1 | 4/2001 |

OTHER PUBLICATIONS

Hao-Song Kong et al., "Edge Map Guided Adaptive Post-Filter for Blocking and Ringing Artifacts Removal", Circuits and Systems, 2004, ISCAS '04, Proceedings of the 2004 International Symposium on Vancouver, BC, Canada, May 23-26, 2004, Piscataway, NJ, USA, IEEE, US, May 23, 2004, pp. III-929-III-932. XP010719412, ISBN: 0-7803-8251-X.

Michael Yuen et al., "A survey of hybrid MC/DPCM/DCT video coding distortions", Signal Processing, Elsevier Science Publishers B.V. Amsterdam, NL, vol. 70, No. 3, Nov. 30, 1998, pp. 247-278, XP004144969, ISSN: 0165-1684.

"PCT International Search Report", dated Jul. 20, 2007 for PCT/US2006/038115, 6pgs.

* cited by examiner

*Primary Examiner*—Yosef Kassa
(74) *Attorney, Agent, or Firm*—Buckley, Maschoff & Talwalkar LLC

(57) ABSTRACT

A method can include selecting a block of pixels. It may be determined whether the block of pixels contains an edge pixel. If the block of pixels contains an edge pixel, a first pixel may be selected among the block of pixels. If it is determined that the first pixel is a ringing noise pixel, a ringing filter may be applied. An edge-preserved filter may be applied if the first pixel is not a ringing noise pixel.

18 Claims, 14 Drawing Sheets

US 7,548,660 B2

SYSTEM AND METHOD OF SPATIO-TEMPORAL EDGE-PRESERVED FILTERING TECHNIQUES TO REDUCE RINGING AND MOSQUITO NOISE OF DIGITAL PICTURES

BACKGROUND

Recent industry video compression standards adopt techniques of motion compensation, transform, quantization and entropy coding to encode video for video communication applications. Quantization is the lossy process of reducing the data bit rate to meet the bandwidth requirements of an application, but it occurs at the cost of picture quality. The information loss during the quantization process is unrecoverable, and thus the coding artifact may be introduced. Reducing the artifact distortion is an important factor in the field of noise reduction filtering.

Ringing and mosquito noise are among the worst artifacts introduced by the quantization process. They are associated with Gibb's phenomenon and are caused by the abrupt truncation of high frequency discrete cosine transform (DCT) coefficients. The ringing noise artifact is most evident along the high contrast edges in the areas of greatly smooth background. It manifests as the rippling extending outwards from the edges, and it impairs the picture quality. The mosquito noise artifact is apparent as a form of edge busyness distortion associated with movement, or a luminance/chrominance level fluctuation, close to the boundary of moving objects. Some techniques utilized to reduce the noise artifacts may involve applying a low pass filter (LPF) which can degrade picture quality.

DETAILED DESCRIPTION

Figure 1:
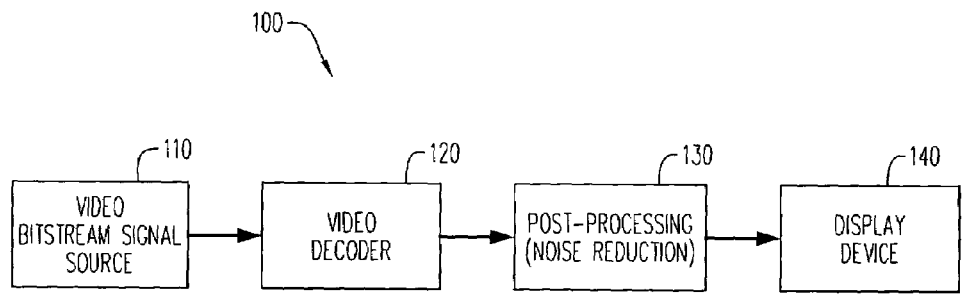
FIG. 1 is a block diagram of an apparatus which generates a video display from a video bit-stream in accordance with some embodiments.

FIG. 1 is a block diagram of an apparatus 100 which generates a video display from a video bit-stream in accordance with some embodiments.

The apparatus 100 includes a source 110 of a video signal bit-stream. For example, the source 110 may receive a video signal via a communication channel (which is not separately shown) or may reproduce a video signal from a storage medium such as a DVD or a hard disk drive. For example, the video signal source may include a video tuner, a satellite earth station, or a DVD player. It will be assumed that the video signal bit-stream represents a video signal that has been compression encoded, e.g., in accordance with one of the compression standards. The source 110 may operate in accordance with conventional practices.

Image information may be processed in connection with International Telecommunication Union-Telecommunications Standardization Sector (ITU-T) recommendation H.264 entitled "Advanced Video Coding for Generic Audiovisual Services" (2004) or the International Organization for Standardization (ISO)/International Engineering Consortium (IEC) Motion Picture Experts Group (MPEG) standard entitled "Advanced Video Coding (Part 10)" (2004). As other examples, image information may be processed in accordance with ISO/IEC document number 14496 entitled "MPEG-4 Information Technology—Coding of Audio-Visual Objects" (2001) or the MPEG2 protocol as defined by ISO/IEC document number 13818-1 entitled "Information Technology—Generic Coding of Moving Pictures and Associated Audio Information" (2000).

The apparatus 100 also includes a video decoder 120 to decompress and decode the video signal bit-stream supplied by the source 110. The video decoder 120 may operate in accordance with conventional principles, and may tend to produce artifacts in the output video image, subject to amelioration via embodiments to be described below.

The apparatus 100 further includes a post-processing block 130 coupled to the video decoder 120. The post-processing block 130 performs one or more kinds of post processing on the decompressed video signal output from the video decoder 120. For example, the post-processing block 130 may perform one or more different kinds of noise reduction processing as in one or more of the embodiments described below.

In addition, the apparatus 100 includes a display device 140, such as a television or a computer display monitor. The display device 140 displays the video signal that is output from the post-processing block 130.

Figure 2:
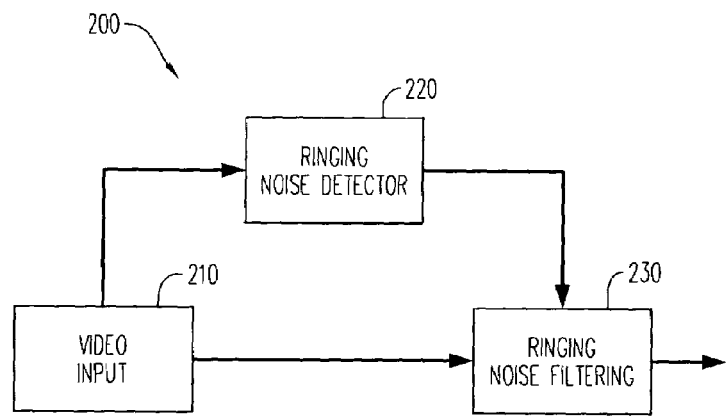
FIG. 2 is a functional block diagram that illustrates some operations of a noise reduction block that is part of the apparatus of FIG. 1.

FIG. 2 is a functional block diagram 200 that illustrates aspects of a noise reduction process that may be performed in the post-processing block in accordance with some embodiments. Block 210 represents the post-processing block (or a noise reduction sub-block) 130 receiving an input video signal (e.g., directly or indirectly from the video decoder 120) that is to be subjected to noise reduction processing. Block 220 represents a process provided in accordance with some embodiments to detect locations (e.g., specific pixels), in the video signal received at block 210, which exhibit ringing noise artifacts. Block 230 represents a process in which filtering is applied to the input video signal received at 210 to mitigate ringing noise artifacts.

Figure 3:
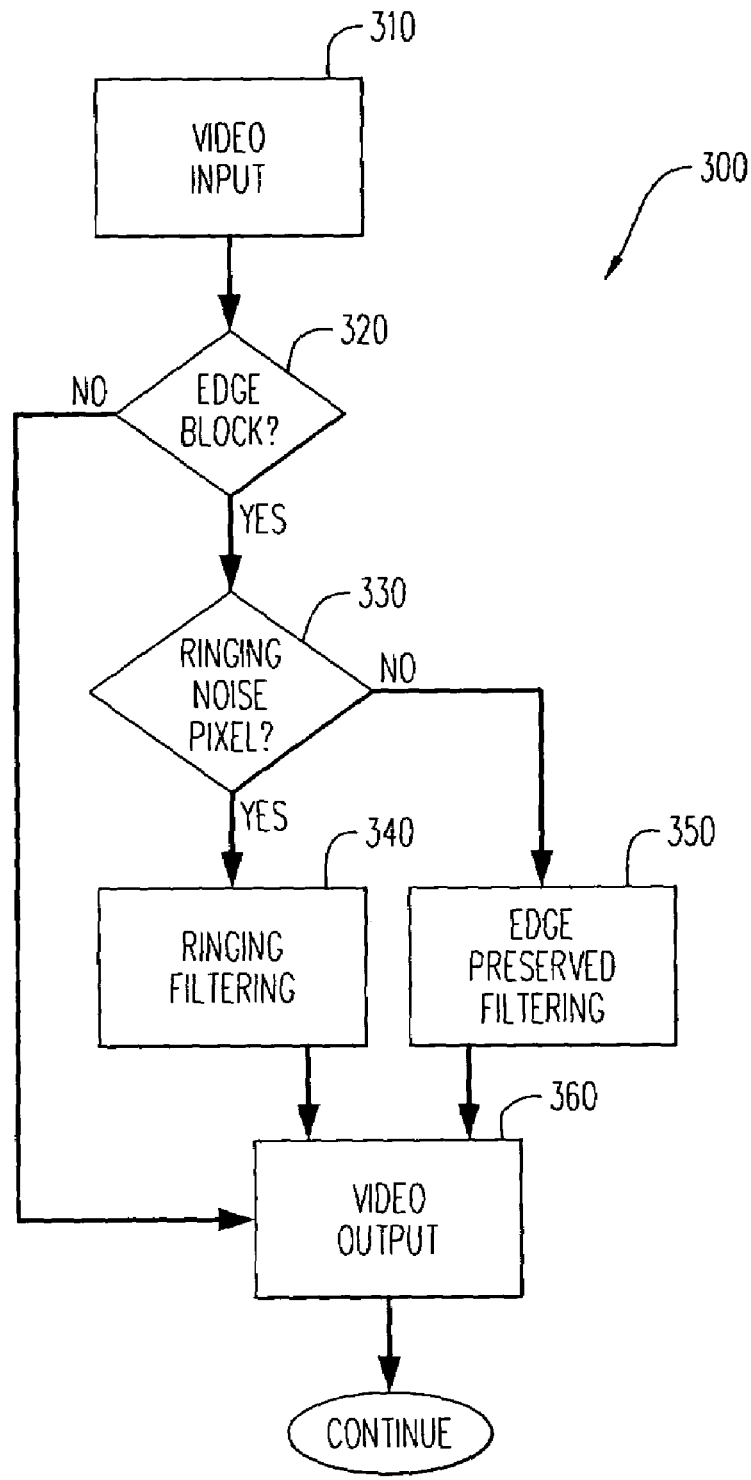
FIG. 3 is a flow chart that illustrates a ringing noise filtering process performed by a noise reduction block of FIG. 2.

FIG. 3 is a high-level flow chart 300 that illustrates a ringing noise filtering process performed by the noise detector sub-block of the post-processing/noise reduction block 130 in accordance with some embodiments. Block 310 in FIG. 3 represents receipt by the ringing noise detector sub-block 220 of the decompressed video signal to be filtered for purposes of ringing noise reduction. In 310, the video input is broken into blocks of pixels, such as 8 pixels by 8 pixels. 310 advances to 320.

Then, in 320, each of these pixels within a block is examined to determine if any of the pixels within the block is an edge pixel. Any one of a number of edge detectors may be employed. In some embodiments, the so-called Sobel edge detector may be employed. A block of pixels is designated an "edge block" if any of the pixels within a defined block contains an edge of an object that is pixilated. For example, if any of the pixels within the defined block contain the edge of a leaf, the block of pixels is an "edge block." If no edges are contained within the block, it is a non-edge block. However, if a second block of pixels that is adjacent within the defined block contains an edge, the defined block of pixels is defined as a "near-edge block" ("NEB."), as the second block of pixels contains an edge. If the block is not an edge block, no ringing filtering occurs, and method 300 advances to 360, and the video stream is output without ringing filtering being applied. However, if the block is an edge block, then 320 advances to 330. In some embodiments, NEB status is also considered in flow chart 300.

In 330, it is determined whether a selected pixel within the edge block is a ringing noise pixel. Any one of a number of ringing noise detectors may be employed. In some embodiments, a Sobel edge detector may be employed. If the selected pixel is a ringing noise pixel, then 330 advances to 340. If the selected pixel is not a ringing noise pixel, 330 advances to 350.

In 340, ringing filtering is employed with the ringing pixels of the edge block. As will be described in greater detail in conjunction with FIGS. 4-6, a "Spatial Double Layered Median Filter" (SDLMF) or a "Spatio-Temporal Double Layered Median Filter" (STDLMF) may be employed. 340 advances to 360, the ringing filtered output is conveyed as video output in 360, and method 300 then ends.

In 350, edge-preserved filtering is applied to the pixel found not to be a ringing pixel, but within an "edge" block. Briefly, as will be described in greater detail in conjunction with FIGS. 7-9, a weighting factor may be applied to the neighborhood of an edge pixel as an aid in preserving edges. 350 advances to 360, the edge filtered output is conveyed as video output in 360, and method 300 then ends.

Figure 4:
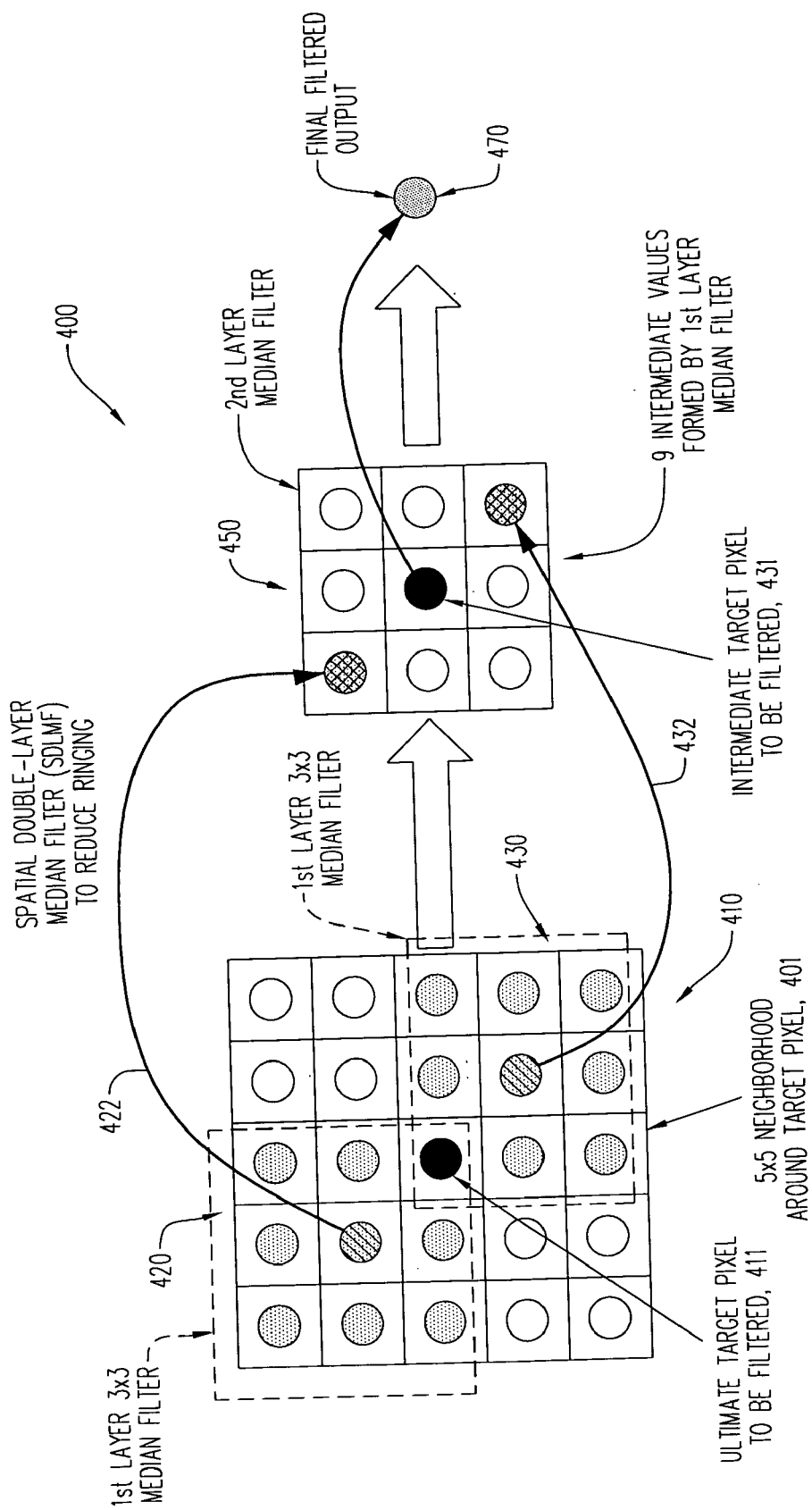
FIG. 4 illustrates aspects of a spatial double-layer median filter to reduce ringing of FIG. 3.

FIG. 4 illustrates the SDLMF 400 in more detail. A ringing pixel 411 within an edge block has been detected. Therefore, an 8×8 block (not illustrated) is broken down into a 5×5 block 401, with the center of the block focused on the ringing pixel 411. Inside the 5×5 window 401, there are 9 separate overlapping 3×3 blocks, each having its own center pixel 422, 432 and so on. For instance, in SDLMF 400, two boxes are illustrated, 420, 430, but nine are instantiated, each box centered around the target pixel and the pixels surrounding the target pixel. This is the first layer of the SDLMF 400.

Typically in video system 100, a pixel has one or more associated values. For instance, this value can correspond to an intensity of color. Therefore, there is a matrix of values associated with a given pixel in a 3×3 block, wherein each value corresponds to a metric, be it color or intensity, etc. of the nine surrounding pixels. For instance, these values associated with pixel 422 could be:

| 1 | 8 | 9 |
| 5 | 23 | 118 |
| 100 | 12 | 19. |

Pixel 422 has a median value for its 3×3 matrix 420. The median value is the middle value of a sequence of numbers. For instance, in the above matrix, 12 is the median value (there are 4 values higher than 12, and 4 values less than 12), but the mean value (total the values and divide by the number of entries) would be approximately 37.8. In 340 of FIG. 3, the median value for each of the pixels for each neighboring pixel 422, 432 and so on is calculated. This is the first layer filtering. Then, each of the median values are then stored as the 9 intermediate values in intermediate 3×3 intermediate block 450. Again, median filtering is applied around the central pixel 411, as discussed above, and a second (final) filtered value for the pixel 470 is calculated. Thereby, target pixel 411 is filtered into pixel 470.

Figure 5:
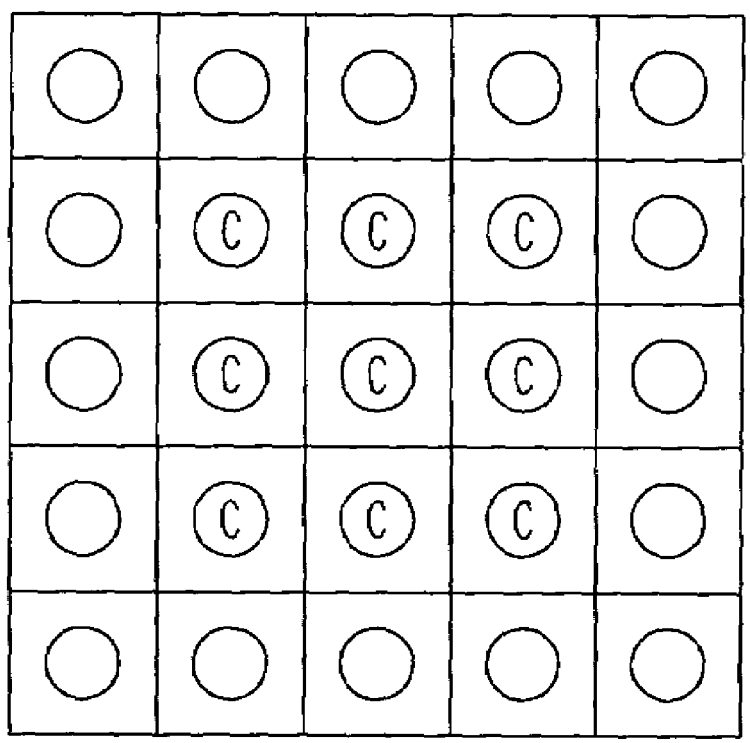
FIG. 5 illustrates further aspects of a double-layer median filter to reduce ringing of FIG. 3.

As illustrated in the FIG. 4, partial SDLMF filtering comprises use of two 3×3 boxes: 420, 430, (there would be another seven boxes in use, total nine) which are used to generate intermediate 3×3 layer 450. In the first layer 401, the 5×5 neighborhood centered on the target pixel 411 as the filter support. Turning briefly to FIG. 5, inside the 5×5 window 500, there are totally nine sets of the 3×3 pixels and are marked the associated centered pixels each for its own 3×3 matrix, drawn as "c", for the set of these 3×3 pixels in FIG. 4.

Turning back to FIG. 4, the median filtering is applied on every set of 3×3 pixels and thus are produced nine intermediate values as a result as illustrated in box 450. In the second layer the median filtering is applied on these nine intermediate values to work generate the filter output 470.

For instance, consider the pixel x located at x(ij), such as pixel 411. A collection of the nine centered pixels $\{c(x(i,j))\}$ for the nine set of 3×3 pixels inside the 5×5 window is $$\{c(x(i,j))\}=\{x(n,m)|n=i-1,i,i+1;m=j-1,j,j+1\ \} \quad [1]$$

The 3×3 neighborhood of centered pixel 411 $c(x(u, v))$ as $NH9(c(x(u, v)))$ $$NH9(c(x(u, v)))=\{x(n,m)|n=u-1,1,u,u+1;m=v-1,v,v+1\} \quad [2]$$

A first layer intermediate value 431 will be produced based on the median filtering on the $NH9(c(x(u, v)))$ $$\text{The layer1\_median}=\text{median}\{NH9(c(x(u,v)))\} \quad [3]$$

The second layer 450 is the median filtering on the nine intermediate values produced from the first layer operation $$\text{The double\_layer\_median}=\text{median}\{\text{median}\{NH9(c(x(u, v)))|c(x(u,v)\in\{c(x(i,j))\}\}\} \quad [4]$$

These nine intermediate values in turn generate final filtered output 470.

Figure 6:
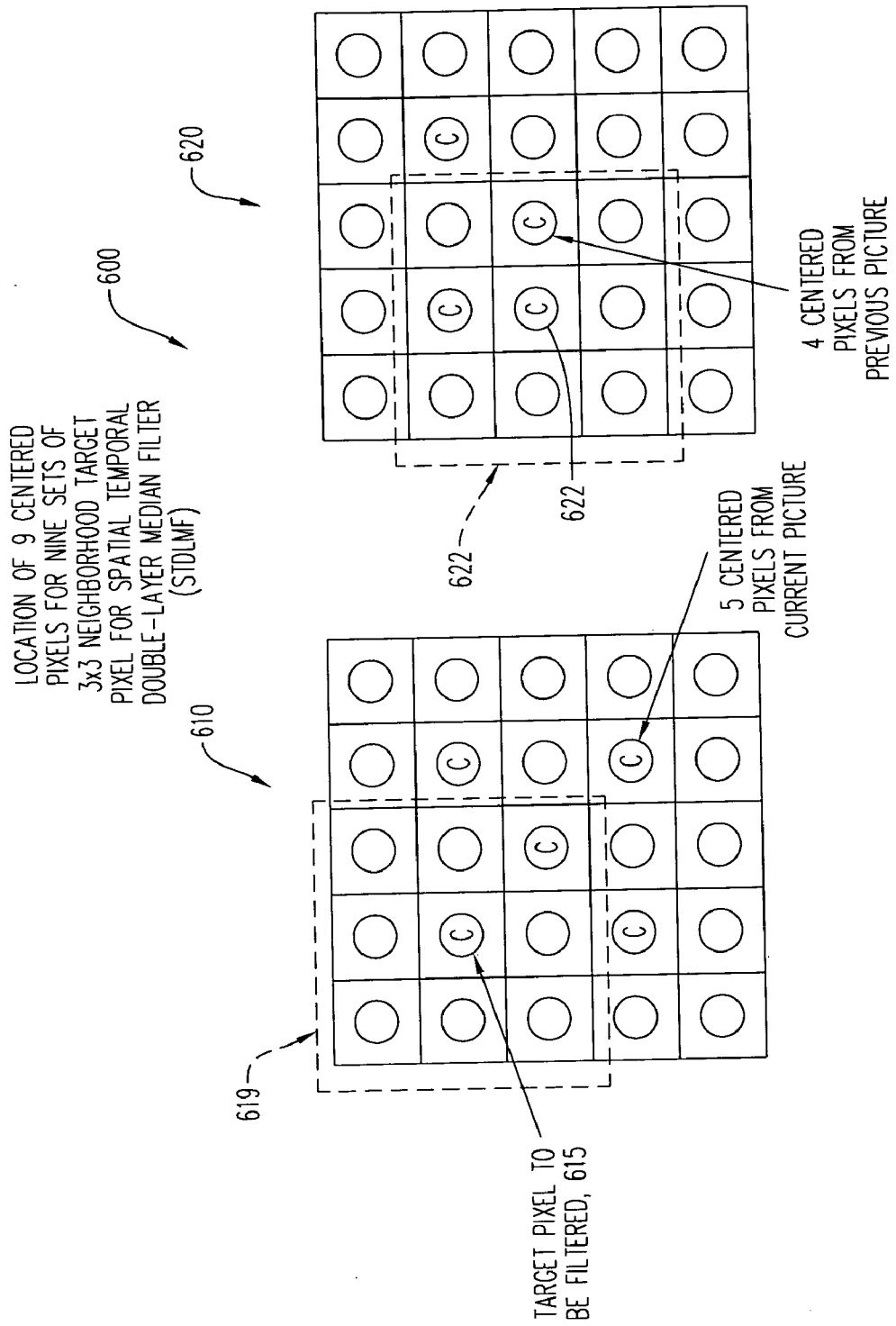
FIG. 6 illustrates a spatial-temporal double-layer median filter to reduce ringing.

FIG. 6 illustrates a further aspect of ringing filtering, to include the time domain as well. FIG. 6 illustrates the use of spatio-temporal double layered median filter (STDLMF) operation. Similar to the STLMF filter of FIG. 5, the STDLMF of FIG. 6 also employs a double layer median filtering, but in order to determine at least some of the of the intermediate values, at least some reference pixels from a previous picture are employed. FIG. 6 illustrates the location of 5 centered pixels 617 at the current picture 610 and of 4 centered pixels at a previous picture 620. Consider the pixel 615 of picture k. "k−1" denotes the employment of pixels from the previous picture. The collection of the nine centered pixels {c(x(I,j;k))} from both pictures are denoted as follows in Equation. 5.

$$\{c(x(i,j;k))\}=\{x(i-1,j-1;k),x(i-1,j+1;k),x(i+1,j-1;k),x(i+1,j+1;k),x(i,j;k)\ x(i-1,j-1;k-1)x(i-1,j;k-1),\ x(i+1,j-1;k-1),x(i,j;k-1)\} \quad [5]$$

The 3×3 neighborhood of the centered pixel c(x(u, v; l)) is denoted as NH9(c(x(u, v, l))) 619, as denoted in Equation 6.

$$NH9(c(x(u,v;l)))=\{x(n,m;z)|n=u-1,u,u+1;\quad m=v-1, v,v+1;z=l\} \quad [6]$$

A first layer output is produced based on the median filtering on the NH9(c(x(u, v; 1))), as denoted in Equation 7.

$$\text{The layer1\_median}=\text{median}\{NH9(c(x(u,v;l)))\} \quad [7]$$

The second layer is the median filtering on the nine intermediate values produced from the first layer operation, as illustrated in Equation 8.

$$\text{The double\_layer\_median}=\text{median}\{\text{median}\{NH9(c(x(u,v;l)))\ |c(x(u,v;l)\in\{c(x(i,j;k))\}\}\} \quad [8]$$

The above procedures are repeated for each selected pixel, both in current picture 610 and previous picture 620. Then, these values for each of the pixels are themselves taken for a median value, to generate a final pixel value.

The STDLMF filter may be especially beneficial when the image information is very noisy, while the SDLMF filter might be recommended for image information with a lot of motion.

In a further embodiment, only a single median filter is used. In this case, a larger filter, such as a 5×5 box, may be used, and the filtered value is derived from this. In a still further embodiment, although only a single median filter is used, pixel values from different digital photographs are used to derive the filtered value.

Figure 7:
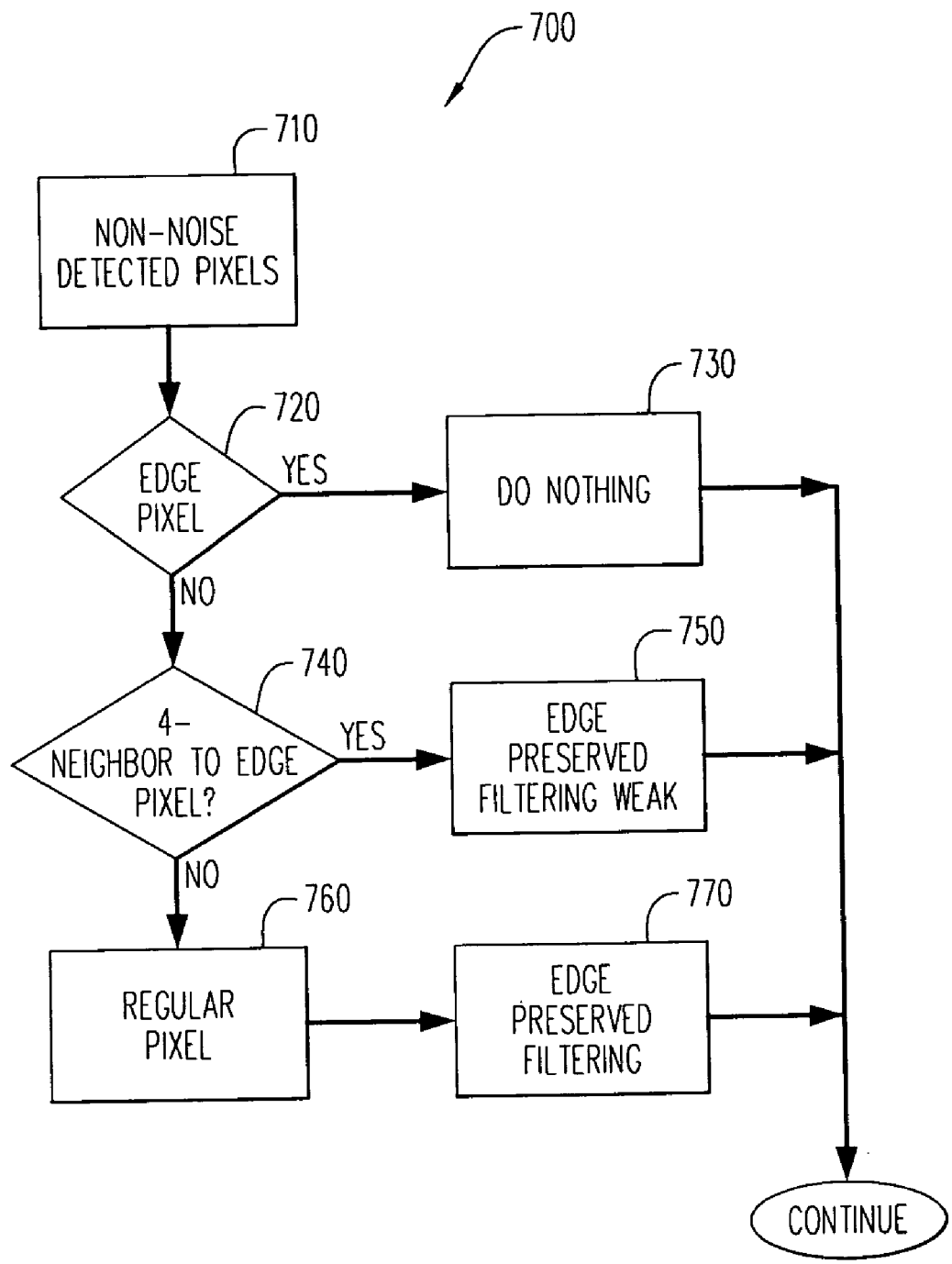
FIG. 7 illustrates a method that is used by FIG. 3 with edge-preserved filtering.

FIG. 7 illustrates a method 700 for edge-preserved processing 350 of FIG. 3. If it has been determined in 330 that a selected pixel is not a ringing noise pixel, then method 700 is invoked by 350. In order to keep the picture sharp, filtering might not be applied on the detected edge pixels and relatively small amount of filtering might be applied on the 4-neighbor pixels to the edge pixel.

In 710, the video input is received by the method 700. 710 advances to 720.

In 720, it is determined whether the selected pixel is an edge pixel. This can be performed by, for instance, a Sobel-edge detector. If the selected pixel is an edge pixel, 720 advances to 730, and no further processing is performed to the selected pixel, and the method stops. However, if the selected pixel is not an edge pixel, 720 advances to 740.

In 740, it is determined whether the selected pixel is directly above, below or adjacent to an edge pixel. If yes, then 740 advances to 750. If no, 750 advances to 760.

In 750, "weak" edge-preserved filtering is performed. Details on this filtering will be given in a discussion regarding edge-preserved filtering in 770, below In 760, therefore, it is determined that the selected pixel is a "regular" pixel.

Therefore, 760, advances to 770.

In 770, edge-preserved filtering is performed. For edge-preserved filtering, consider the adjacent pixel y to the target pixel x, we use the spatial 3×3 neighborhood of the pixel x, NH9(x), as the filter support to do the filtering. Consider pixel y as the pixels in the NH9(x). The edge-preserved filter works as follows:

$$\text{edge\_preserved\_filtering}=\sum_{y\in NH9(x)} w(y)\cdot\delta(y|x) \quad [9]$$

where:

$$\delta(y|x)=\begin{cases} y, \text{ if } |x-y|\le Th(x) \\ x, \text{ if } |x-y|> Th(x) \end{cases} \quad [10]$$

In other words, looking at equation 10 first, the target pixel "x" is compared to an adjacent pixel "y". A threshold is set as Th(x). Th(x) is a pre-determined threshold value, and in some cases Th(x) could be programmed from users for specific applications. If the absolute value of "x" (target pixel) minus "y" is less than or equal to a threshold (i.e., x and y are within a threshold magnitude of one another), then the value of delta (y|x) is "y" is used for the "x" pixel. If the absolute value of "x" (target pixel) minus "y" is greater than a threshold, then the value of delta (y|x) is "x" is kept for the "x" pixel.

Returning to Equation. 9, this comparison is performed for all of the "y" pixels in the 3×3 area of the target pixel "x." Then, each of these determined values is then dot-product multiplied by a corresponding "weighting factor," and then summed for a final edge-preserved filtering value.

One embodiment of the weighting factor w(y) is formulated below:

$$\text{Weighting\_factor } w(y) = \begin{bmatrix} 1 & 2 & 1 \\ 2 & 4 & 2 \\ 1 & 2 & 1 \end{bmatrix} \quad [11]$$

In this particular embodiment, the relative weight of individual pixels surrounding a target pixel is a factor of four for the target pixel, a factor of two for the directly adjacent pixels, and a factor of one for the diagonally adjacent pixels.

In 750, Th(x) is adjusted downward to decrease the level of filtering that takes place. In other words, in Equation 10, if the threshold is set lower, then there is a smaller difference between the value of x and y for the value of x to replace y, so there is less filtering.

Figure 8:
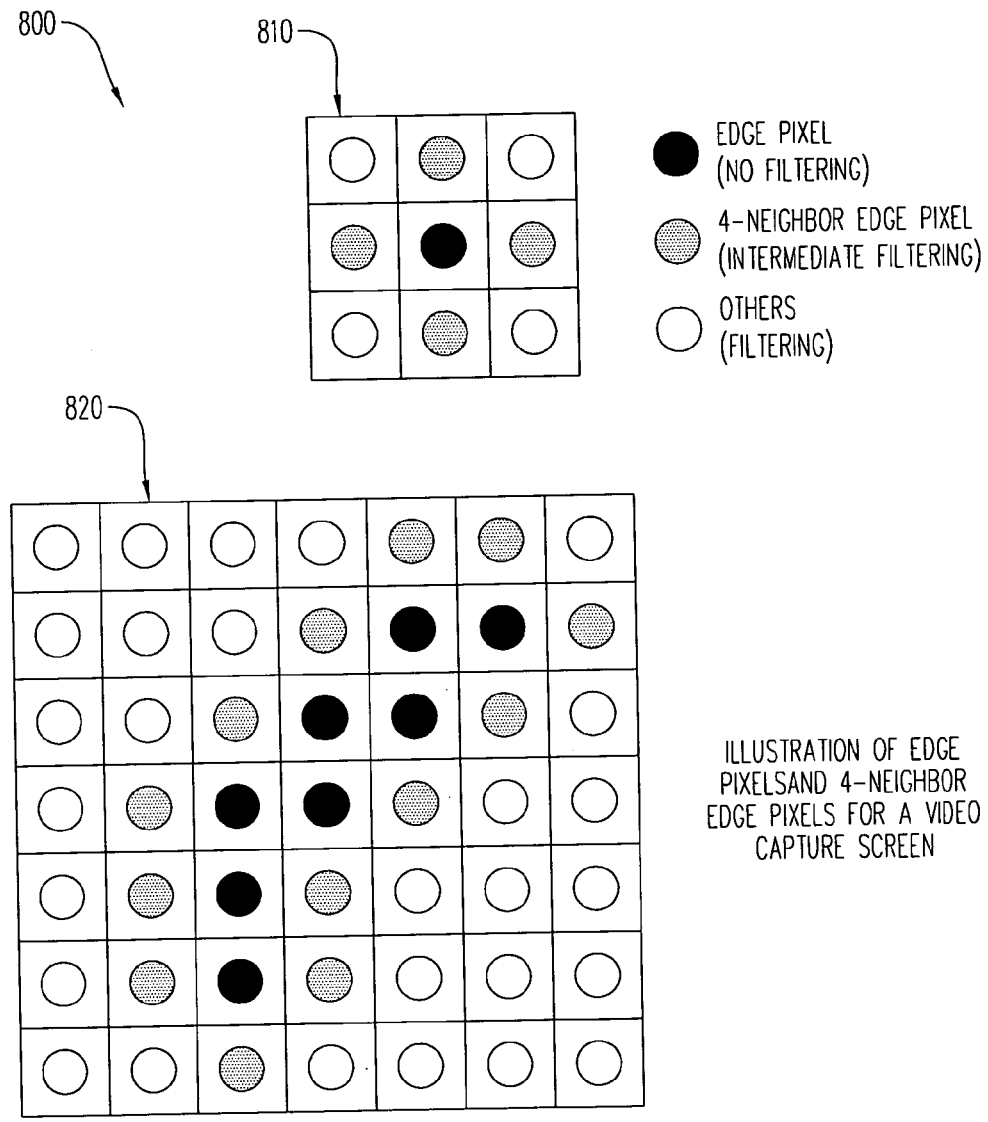
FIG. 8 illustrates an exemplary embodiment of a video screen for FIG. 7 with filtered and non-filtered video pixels.

FIG. 8 illustrates locations of the non-edge 4-neighbor-to-edge pixels. Block 810 illustrates the locations of the edge pixel (black), the directly adjacent pixels (grey) and diagonally adjacent pixels (white). Block 820 illustrates one example of an 8×8 block that has been classified as including edge pixels, neighboring pixels, and other pixels, as part of method 700.

Figure 9:
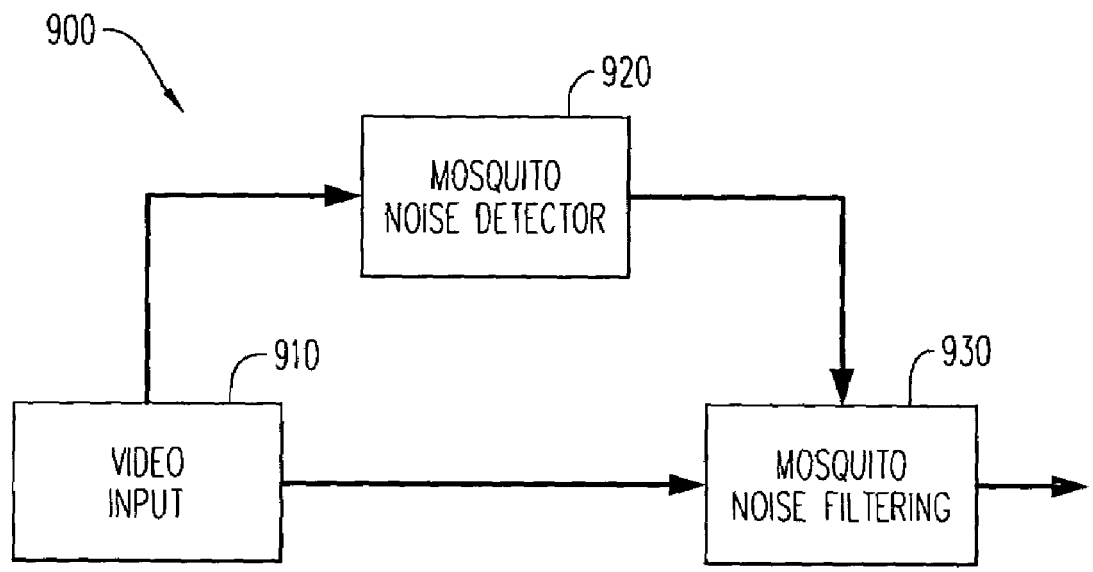
FIG. 9 is a block diagram of an apparatus which generates a video display from a video bit-stream in accordance with some embodiments.

FIG. 9 is a functional block diagram 900 that illustrates aspects of a noise reduction process performed in accordance with some embodiments. Block 910 represents the post-processing block (or a noise reduction sub-block) receiving an input video signal (e.g., directly or indirectly from the video decoder 110) that is to be subjected to noise reduction processing. Block 920 represents a process provided in accordance with some embodiments to detect locations (e.g., specific pixels), in the video signal received at 910, which exhibit mosquito noise artifacts. Block 930 represents a process in which filtering is applied to the input video signal received at 910 (based on results obtained by the mosquito noise detector 920), to mitigate the mosquito noise artifacts.

Figure 10:
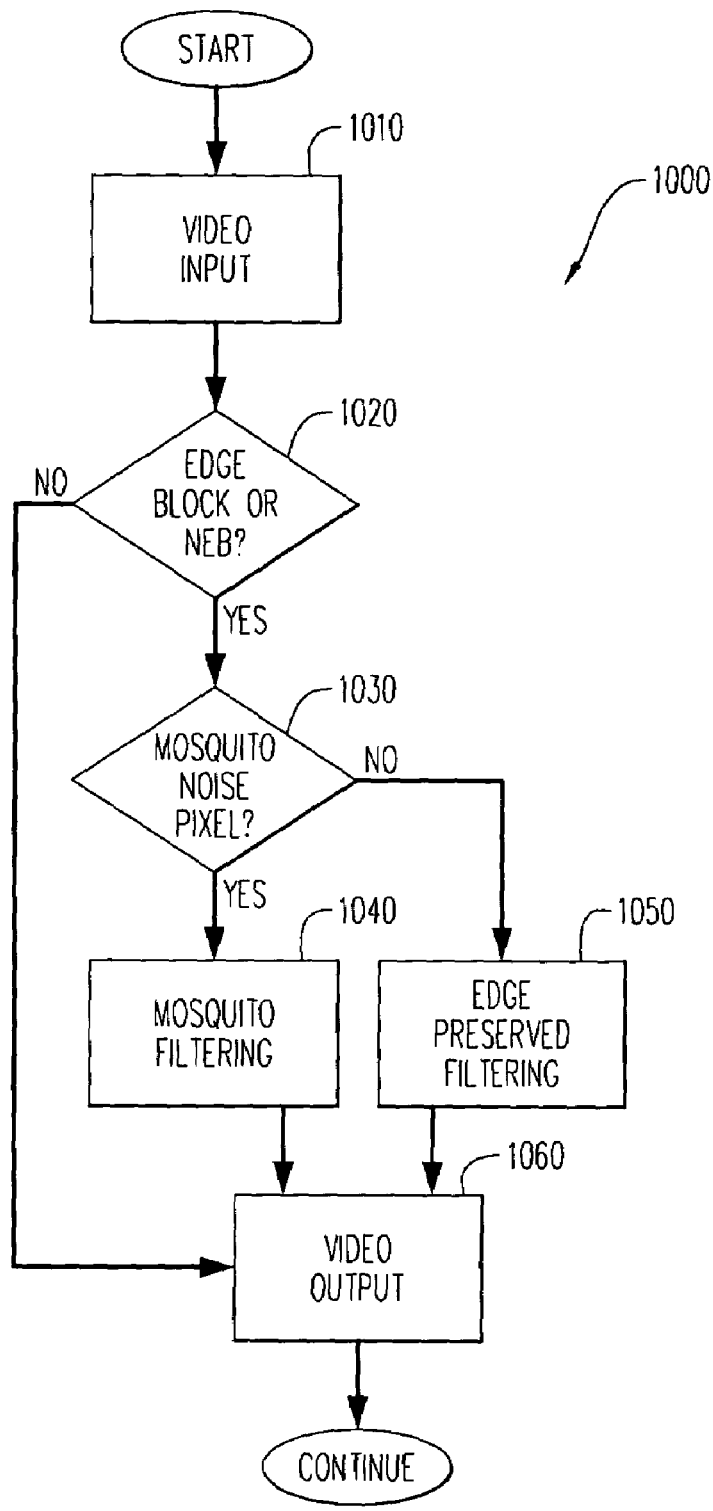
FIG. 10 is a flow chart that illustrates a mosquito noise reduction process performed by the noise reduction block.

FIG. 10 is a flow diagram 1000 for detection of mosquito pixels. A block of pixels, (such as an 8×8 block of pixels) may be designated an edge block if it contains at least one edge pixel. In FIG. 10, the non-edge blocks are reviewed to see if the designated block is an edge block or is a Neighbor to the Edge Blocks (NEB), in which case the selected block is designated an NEB, as will be detailed below.

Generally, every pixel in the edge blocks are examined by a mosquito noise metric to classify pixels as either mosquito noise pixels and non-mosquito noise pixels. The mosquito noise filtering is applied to the detected mosquito noise pixels and the edge-preserved filtering on the remaining pixels of the considered blocks.

In process 1000, video input is tested for mosquito noise. In 1010, decoded video input is received. In 1020, the video input is broken into blocks of pixels, usually 8 pixels by 8 pixels. Then, in 1020, each of these pixels is examined to determine if any of the pixels is an edge pixel. Furthermore, it is determined if any of the directly neighboring blocks contain an edge pixel. If so, the block of pixel is designated an NEB.

Any one of a number of edge detectors may be employed. In some embodiments, the so-called Sobel edge detector may be employed. Mosquito noise detection uses a temporal metric, instead of the spatial metric used for ringing noise detection. If the block is not an edge block (i.e., does not contain at least one edge pixel) or as not an NEB, no mosquito filtering occurs for any pixel on this block, and method 1000 advances to 1060 where the video stream is output. However, if the block is an edge block or has a neighboring block that is an edge block, then 1020 advances to 1030.

In 1030, it is determined whether each pixel within the selected block is a mosquito noise pixel. Any one of a number of mosquito detectors may be employed. In some embodiments, the Sobel edge detector may be employed. If the selected pixel is a mosquito noise pixel, then 1030 advances to 1040. If there is no mosquito noise pixel within the block, 1030 advances to 1050.

In 1040, mosquito filtering is employed of the pixels of the edge block. As will be described in greater detail in conjunction with FIGS. 11-13, a "Spatial Double Layered Median Filter" (SDLMF) or a "Spatio-Temporal Double Layered Median Filter" (STDLMF) may be employed. 1040 advances to 1060, the mosquito filtered output is conveyed as video output in 1060, and method 1000 then ends.

In 1050, edge-preserved filtering is applied to the pixel found to be a mosquito pixel, but within the "edge" block or if the selected block is an NEB, as was described in conjunction with FIGS. 6-9, above. 1050 advances to 1060, and the edge filtered output is conveyed as video output in 1060.

Figure 11:
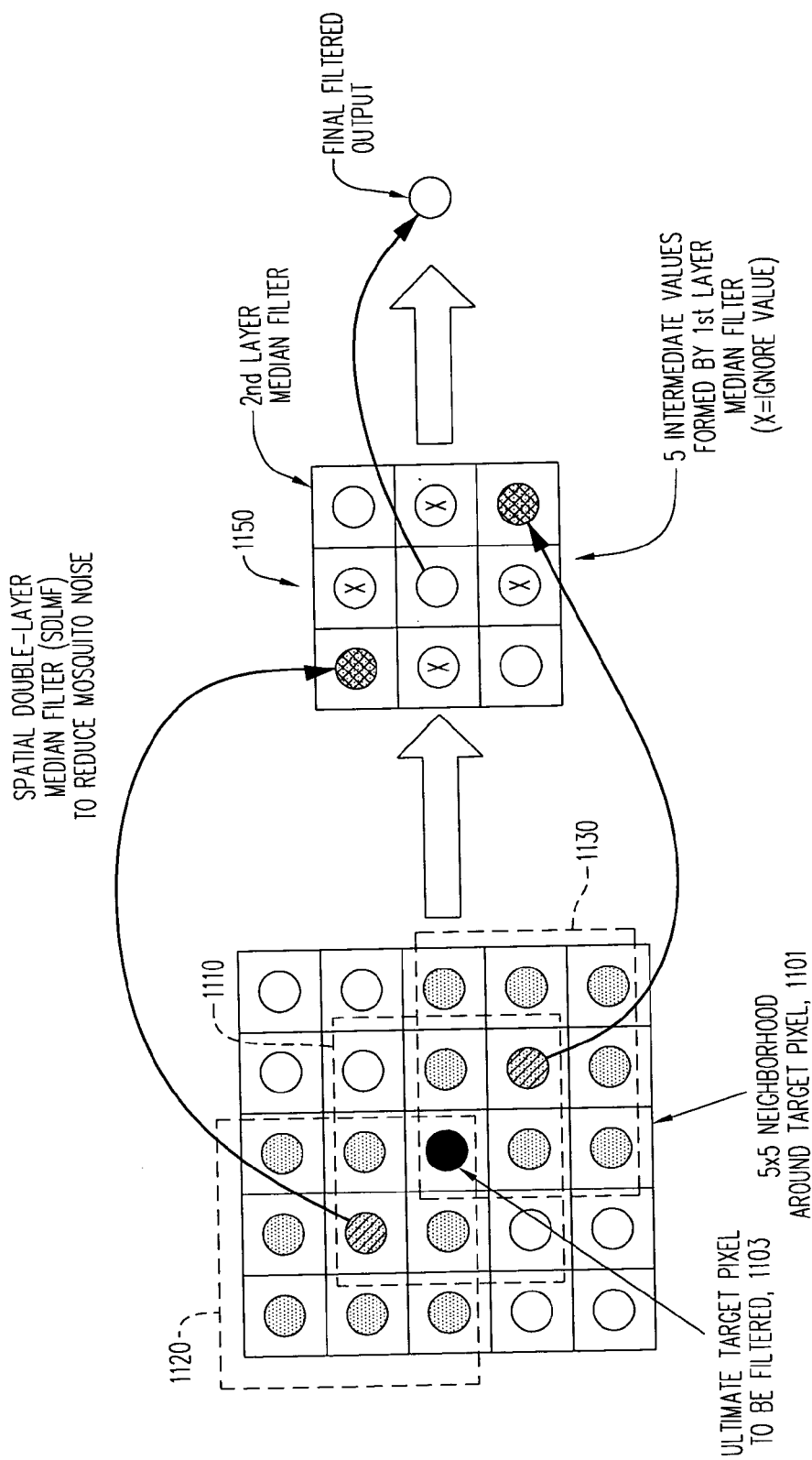
FIG. 11 illustrates aspects of a spatial double-layer median filter to reduce mosquito noise of FIG. 10.
Figure 12:
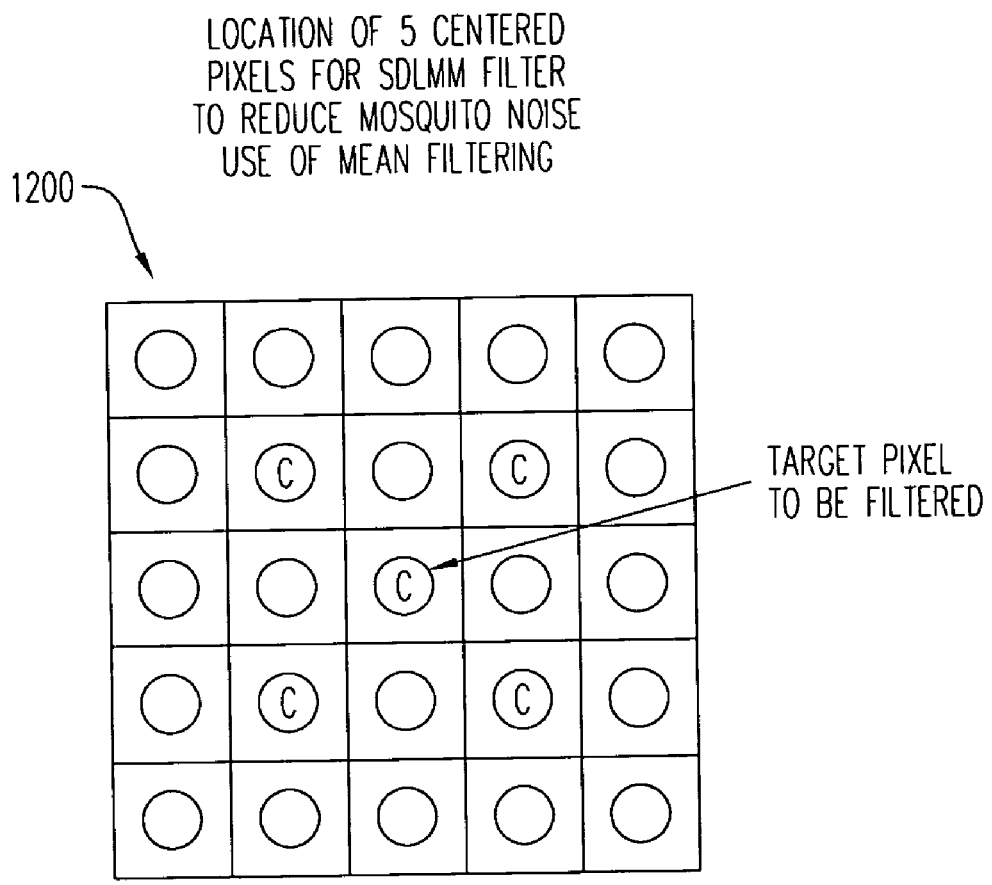
FIG. 12 illustrates aspects of five centered pixels for SDLMM filter to reduce of mosquito noise through the use of mean filtering.

FIG. 11 illustrates the SDLMF 1100 for mosquito noise detection in more detail. A mosquito pixel 1103 within the non-edge block has been detected. Therefore, the 8×8 block is broken down into a 5×5 block 1101, with the center of the block focused on the mosquito pixel 1103. Inside the 5×5 window 1101, there are 5 separate of overlapping 3×3 blocks, each having its own center. For instance, in SDLMF 1110, two boxes are illustrated, 1120, 1130, but five are instantiated, each box centered around the pixels surrounding the target pixel. This is the first layer of the filter.

As illustrated in the FIG. 11, the SDLM filtering consists of operation in two layers 1101, 1150. In the first layer 1101, the 5×5 1101 neighborhood is centered on the target pixel 1103 as the filter support to be used as data in applying a filter. Tuning briefly to FIG. 12, inside the 5×5 window, there are totally five sets of the 3×3 pixels and are marked the associated centered pixels to be processed, drawn as "c," for the set of these 3×3 pixels in FIG. 12. Note that the mosquito filtering uses five 3×3 adjacent blocks, as opposed to the nine used in ringing noise filtering.

Turning back to FIG. 11, mean filtering is applied on the five sets of 3×3 pixels and thus are produced five intermediate values in intermediate block 1150 as a result. Please note that for the first layer of filtering, mean filtering may be used in mosquito filtering, as opposed to the median filtering of ringing noise of FIG. 3. In the second layer, median filtering is applied on these five intermediate values (the four diagonal pixels and the target pixel) to generate the final pixel output value.

For instance, consider the pixel x 1103 located at x(i,j). The five centered pixels $\{(c(x(I, j))\}$ in the 5×5 window are:

$$\{c(x(i,j))\} = \{x(i-1,j-1), \quad x(i-1,j+1), x(i+1,j-1), x(i+1,j+1), (i,j)\} \quad [12]$$

The 3×3 neighborhood of centered pixel $c(x(u, v))$ is denoted as $NH9(c(x(u, v)))$ and its definition is same as Equation 2. The first layer output of SDLMM filter is produced based on the mean filtering on the pixel in $NH9(c(x(u, v)))$ $$\text{The layer1\_mean} = \text{mean}\{NH9(c(x(u,v)))\} \quad [13]$$

In other words, in the above case, the mean value (for example, the 37.8 value) would be used for a given pixel, not the median value.

The second layer 1150 then performs a median filtering on the five intermediate values produced from the first layer operation (i.e., layer 1150), as illustrated in the following Equation 14.

$$\text{The double\_layer\_mean\_median} = \text{median}\{\text{mean}\{NH9 \\ (c(x(u,v))) \mid c(x(u,v) \in \{c(x(i,j))\}\}\} \quad [14]$$

These five intermediate values in turn generate final filtered output 1170.

Figure 13:
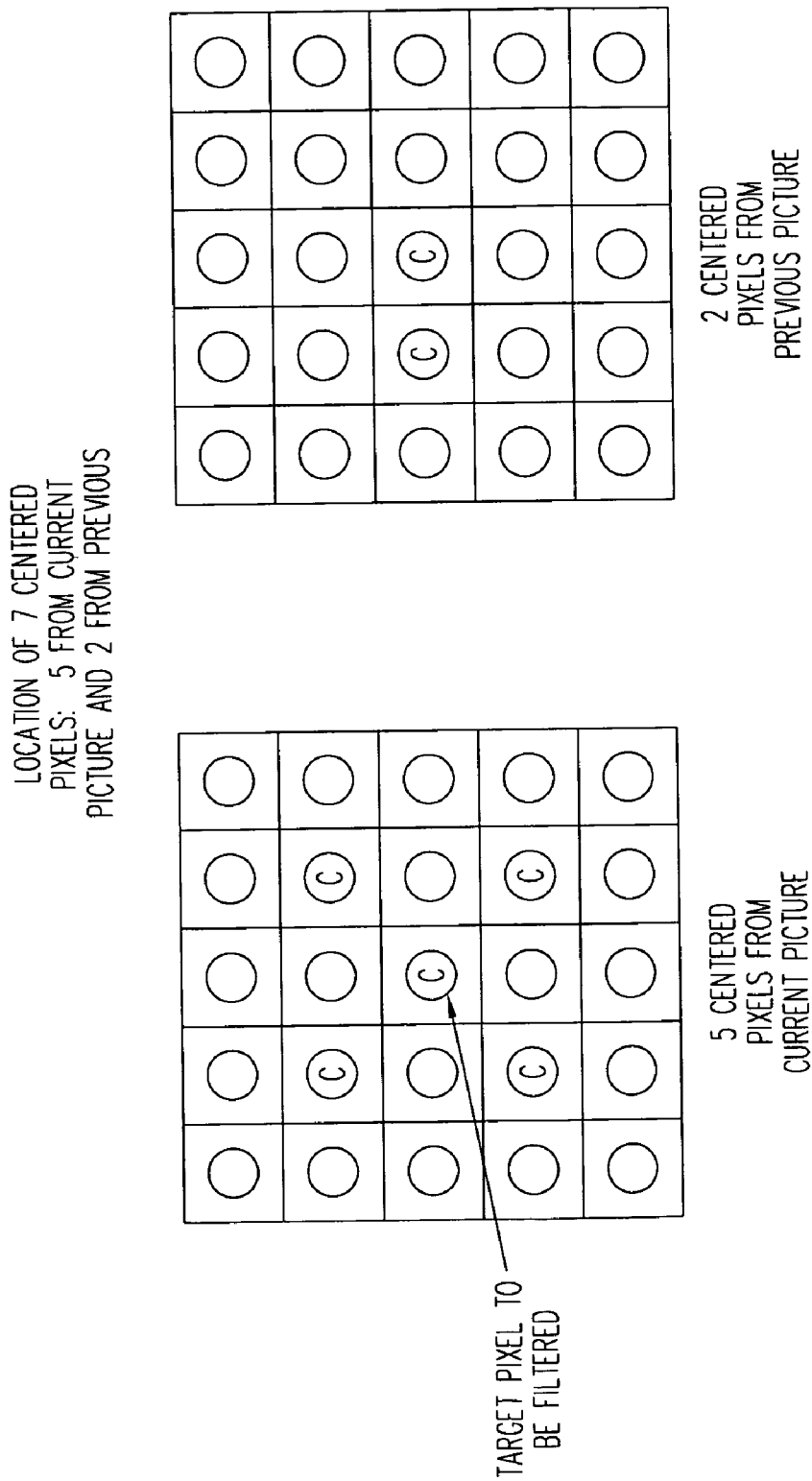
FIG. 13 illustrates aspects of five centered pixels for STDLMM filter to reduce mosquito noise through the use of mean filtering.

In FIG. 13, illustrated is a further aspect of mosquito filtering, to include the time domain as well. FIG. 6 illustrates the use of spatio-temporal double layered median (STDLM) operation. Similar to the STDLM filter of FIG. 6, the STDLM of FIG. 13 also employs a double layer filtering using first a mean filtering and then a median filtering, but in order to determine at least some of the of the intermediate values, at least some reference pixels from a previous picture are employed.

A spatio-temporal version of mosquito noise filter is presented below. Similar to SDLMM filter, a spatio-temporal double layered mean median (STDLMM) filter contains two layered operation, but it has reference pixels coming from the previous picture. FIG. 13 shows the location of 5 centered pixels at the current picture and of 2 centered pixels at the previous picture. Consider the pixel x of picture k, the collection of the seven centered pixels $\{c(x(I,j; k))\}$ is $$\{c(x(i,j;k))\} = \{x(i-1,j-1;k), x(i-1,j+1;k), x(i+1,j-1;k), \\ x(i+1,j+1;k), x(i,j;k), x(i-1,j;k-1), x(i,j;k-1)\} \quad [15]$$

The 3×3 neighborhood of centered pixel $c(x(u, v; l))$ is denoted as $NH9(c(x(u, v; l)))$ and its definition is same as Equation 6. The first layer output of STDLM filter is produced based on the mean filtering on the pixel in $NH9(c(x(u, v; l)))$ $$\text{The layer1\_mean} = \text{mean}\{NH9(c(x(u,v;l)))\} \quad [16]$$

The second layer of STDLMM filtering is the median filtering on the seven intermediate values produced from the first layer mean operation $$\text{The}\_{double}\_\text{layer\_mean\_median} = \text{median}\{\text{mean}\{NH9 \\ (c(x(u,v;l))) | c(x(u,v;l) \in \{c(x(i,j;k))\}\}\} \quad [17]$$

Figure 14:
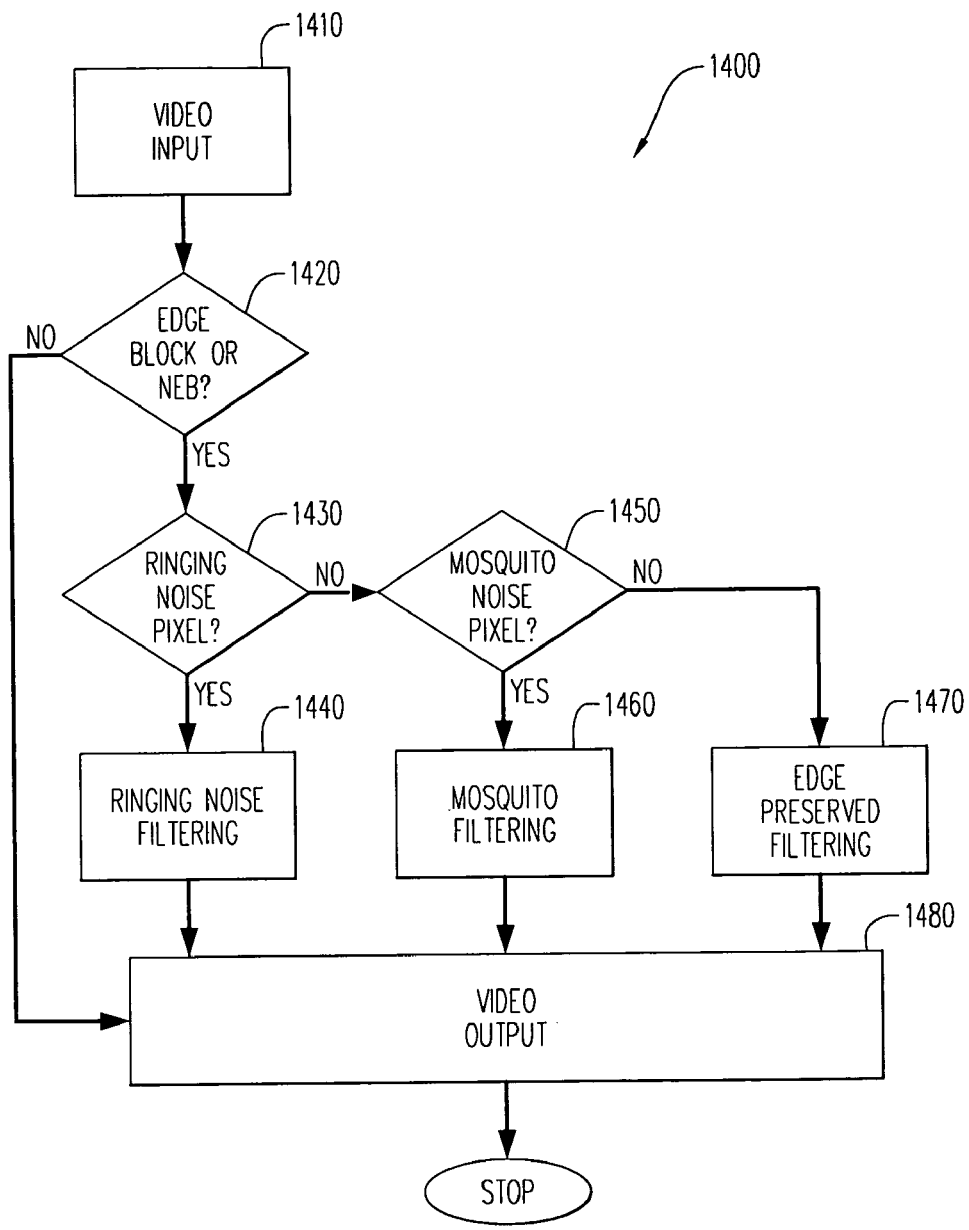
FIG. 14 is a flow chart that illustrates a combined ringing and mosquito edge filtering for video input.

FIG. 14 illustrates a method 1400 for combining the ringing noise filtering of method 300 with the mosquito noise filtering of method 1000.

In 1410, coded video input is received and tested for ringing.

In 1420, the video input is broken into blocks of pixels, usually 8 pixels by 8 pixels. Then, in 1420, each of these pixels is examined to determine if any of the pixels is an edge pixel to have the block designated an edge block. Furthermore, it is determined if any of the directing neighboring blocks contain an edge pixel to have the block designated an NBE. Any one of a number of edge detectors may be employed. In some embodiments, the so-called Sobel edge detector may be employed. If the block is not an edge block (i.e., does not contain at least one edge pixel), and there are no neighboring edge block, no filtering, either of edge or mosquito, occurs for any pixel on this block, and method 1000 advances to 1480, and the video stream is output, and the method ends. However, if the block is an edge block or has a neighboring block that is an edge block, then 1420 advances to 1430.

In 1430, it is determined whether each individual pixel within the selected block is a ringing noise pixel. Any one of a number of mosquito detectors may be employed. In some embodiments, the so-called Sobel edge detector may be employed. If the selected pixel is a ringing noise pixel, then 1430 advances to 1440. If there selected pixel is not a ringing noise pixel, 1430 advances to 1450.

In 1440, ringing noise filter is applied to the ringing noise pixels of the selected block. 1440 advances to 1480, the ringing output is conveyed as video output and method 1400 ends.

In 1450, it is determined whether the selected pixel is a mosquito output. If yes, then 1450 advances to 1460. If not, 1450 advances to 1470.

In 1450, mosquito filtering is applied to the mosquito pixels of the selected block. 1460 advances to 1480, the mosquito filtered output is conveyed as video output, and method 1400 then ends.

In 1470, edge-preserved filtering is applied to the pixel found to be neither a ringing pixel nor a mosquito pixel, but within the "edge" block or NBE. 1470 advances to 1480, the edge filtered output is conveyed as video output in 1480, and method 1400 then ends.

Figure 15:
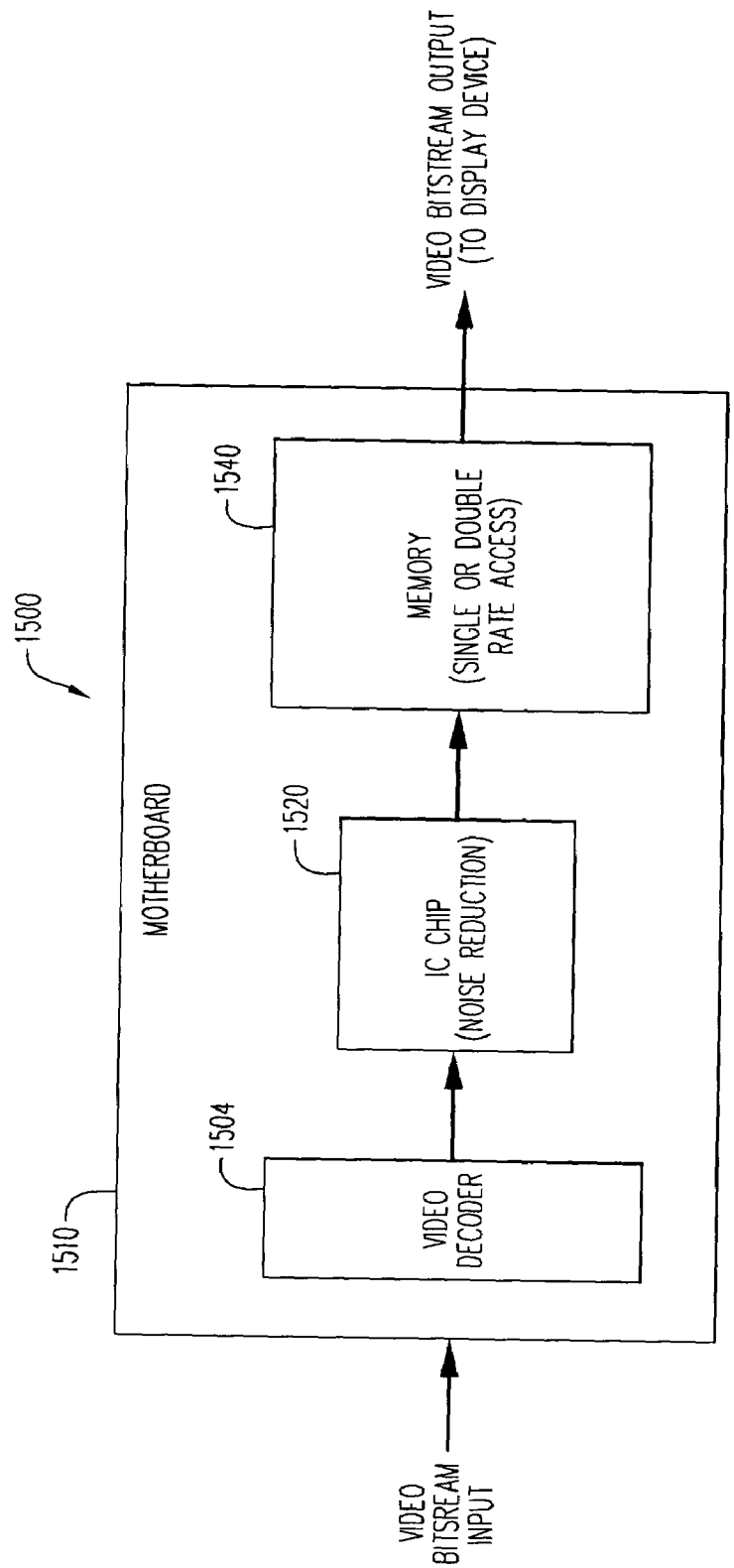
FIG. 15 is a schematic of one embodiment of a system for performing filtering on ringing and mosquito noise.

FIG. 15 illustrates one embodiment of a system 1500 for practicing methods, such as 300 and 1000, of the present application. A motherboard 1510 has a video decoder 1504, an integrated circuit (IC) chip 1520, and a memory 1540. In the system 1500, a video stream is received by the video decoder 1504. The video decoder 1504 then conveys decoded video to the IC 1520. The IC 1520 then performs the various methods and processes as described above. The IC 1520 also employs memory 1540 for storage while performing the processing. Memory 1520 can be a variety of memory types, such as single or double rate memory access random access memory. Filtered output for ringing pixels, mosquito pixels or both can be then output through a video bit-stream output.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method, comprising:
    selecting a block of pixels, using at least one integrated circuit set;
    determining whether the block of pixels contains an edge pixel;
    if the block of pixels contains an edge pixel:
        selecting a first pixel among the block of pixels;
        determining if the first pixel is a ringing noise pixel;
        applying a ringing filter if the first pixel exhibits ringing noise; and applying an edge-preserved filter if the first pixel is not a ringing noise pixel,
    wherein applying the ringing filter comprises:
        creating a first sub-block of pixels from the block of pixels;
        creating a second sub-block of pixels from the block of pixels of the same size of the first sub-block of pixels, wherein the center block pixel of the first sub-block is different than the center block pixel of the second sub-block;
        generating a median value associated with the first block center block pixel with the pixels of the first sub-block; and
        generating a median value associated with the pixels of the second sub-block at the second sub-block center block pixel.

2. The method of claim 1, wherein the determining whether the block of pixels contains an edge pixel comprises employing a Sobel edge detector.

3. The method of claim 1, wherein the second sub-block of pixels correlates to a different time frame the first sub-block of pixels.

4. The method of claim 3, wherein selecting the first and second sub-block of pixels comprises selecting a first set of pixels that is less than nine pixels.

5. The method of claim 1, further comprising:
    generating an intermediate median value for each of the pixels next to each of the center pixels of the first center block pixel and the second center block pixel;
    generating an intermediate matrix from at least the first center block pixel and the second intermediate block pixel; and
    generating a final median value for the center pixel of the intermediate matrix from pixels in the vicinity of the center pixel of the intermediate matrix.

6. The method of claim 5, wherein the center pixel of the intermediate matrix corresponds to a first corner pixel of the first sub-block and a second corner pixel of the second sub-block.

7. The method of claim 1, further comprising:
    determining if a second pixel is a ringing noise pixel;
    applying a ringing filter if the second pixel is a ringing noise pixel; and
    applying an edge-preserved filtering if the second pixel is not a ringing noise pixel.

8. The method of claim 1, wherein the block of pixels comprises an eight by eight block.

9. The method of claim 1, wherein the first and second sub-block of pixels are three by three blocks.

10. The method of claim 1, wherein applying the edge-preserved filter further comprises:
    comparing a first value associated with a center pixel within the first block to a second value of a non center pixel within the first block;

if the magnitude of the first value minus the second value is greater than a threshold value, substituting the first value for the second value.

11. The method of claim 10, further comprising selecting another non-center pixel within the first block; and
comparing a first value associated with a center pixel within the first block to a third value of a non center pixel within the first block;
if the magnitude of the first value minus the third value is greater than a threshold value, substituting the first value for the second value.

12. The method of claim 11, wherein the weighting factor matrix comprises a three by three matrix of the following form:

$$\begin{matrix} 1 & 2 & 1 \\ 2 & 4 & 2 \\ 1 & 2 & 1. \end{matrix}$$

13. The method of claim 10, further comprising:
defining a threshold matrix of a center pixel and a plurality of non-center pixels wherein the first value of the center pixel has been compared to a non-center pixel for at least one pixel non-center pixel;
defining a weighting factor matrix for matrix multiplication with at least said center and non-center pixel within the first block; and
multiplying the weighting factor matrix by the threshold matrix to generate a resultant matrix.

14. The method of claim 1, wherein:
selecting a block of pixels further comprises:
selecting a first block of pixels; and
selecting a second block of pixels adjacent to the first block of pixels; and
determining whether the block of pixels contains an edge pixel further comprises:
determining if either the first block or the second block of pixels adjacent to
the first block of pixels contains an edge pixel;
if either the first or second block of pixels contains an edge pixel:
selecting a first pixel among the first block of pixels;
determining if the first pixel is a mosquito noise pixel if the first pixel is a not a ringing noise pixel;
applying a mosquito filter if the first pixel is a mosquito noise pixel; and
applying an edge-preserved filter if the first pixel is neither a ringing noise pixel nor a mosquito noise pixel.

15. The method of claim 14, wherein determining if the first pixel is a mosquito noise pixel further comprises employing a Sobel edge detector.

16. A method, comprising:
selecting a first block of pixels at least one integrated circuit set;
determining whether the first block of pixels contains an edge pixel;
selecting a second block of pixels adjacent to the first block of pixels;
determining if the second block of pixels adjacent to the first block of pixels contains an edge pixel;
if either the first or second block of pixels contains an edge pixel:
selecting a first pixel among the first block of pixels,
determining if the first pixel is a mosquito noise pixel,
applying a mosquito filter if the first pixel is a mosquito noise pixel, and
applying an edge-preserved filtering if the first pixel is not a ringing noise pixel,
wherein applying a mosquito filter comprises:
creating a first sub-block of pixels from the first block of pixels;
creating a second sub-block of pixels from the block of pixels of the same size of the first sub-block of pixels, wherein the center block pixel of the first sub-block is different than the center block pixel of the second sub-block;
generating a first mean value associated with the first block center block pixel with the pixels of the first sub-block;
generating a second mean value associated with the pixels of the second sub-block at the second sub-block center block pixel; and
generating a final median value as a function of at least the first mean value and the second mean value.

17. A system, comprising:
a video decoder to decode a video bitstream; and
an integrated circuit chip to:
select a block of pixels from the decoded video bitstream;
determine whether the block of pixels contains an edge pixel;
if the block of pixels contains an edge pixel:
select a first pixel among the block of pixels;
determine if the first pixel is a ringing noise pixel;
apply a ringing filter if the first pixel exhibits ringing noise; and
apply an edge-preserved filter if the first pixel is not a ringing noise pixel,
wherein applying the ringing filter comprises:
creating a first sub-block of pixels from the block of pixels;
creating a second sub-block of pixels from the block of pixels of the same size of the first sub-block of pixels, wherein the center block pixel of the first sub-block is different than the center block pixel of the second sub-block;
generating a median value associated with the first block center block pixel with the pixels of the first sub-block; and
generating a median value associated with the pixels of the second sub-block at the second sub-block center block pixel.

18. The system of claim 17, further comprising:
a digital output port to provide filtered image information to a display device.

* * * * *